SMITH & GATES.
Mole Plow.
No 34,074.
2 Sheets—Sheet 1.
Patented Jan. 7, 1862.
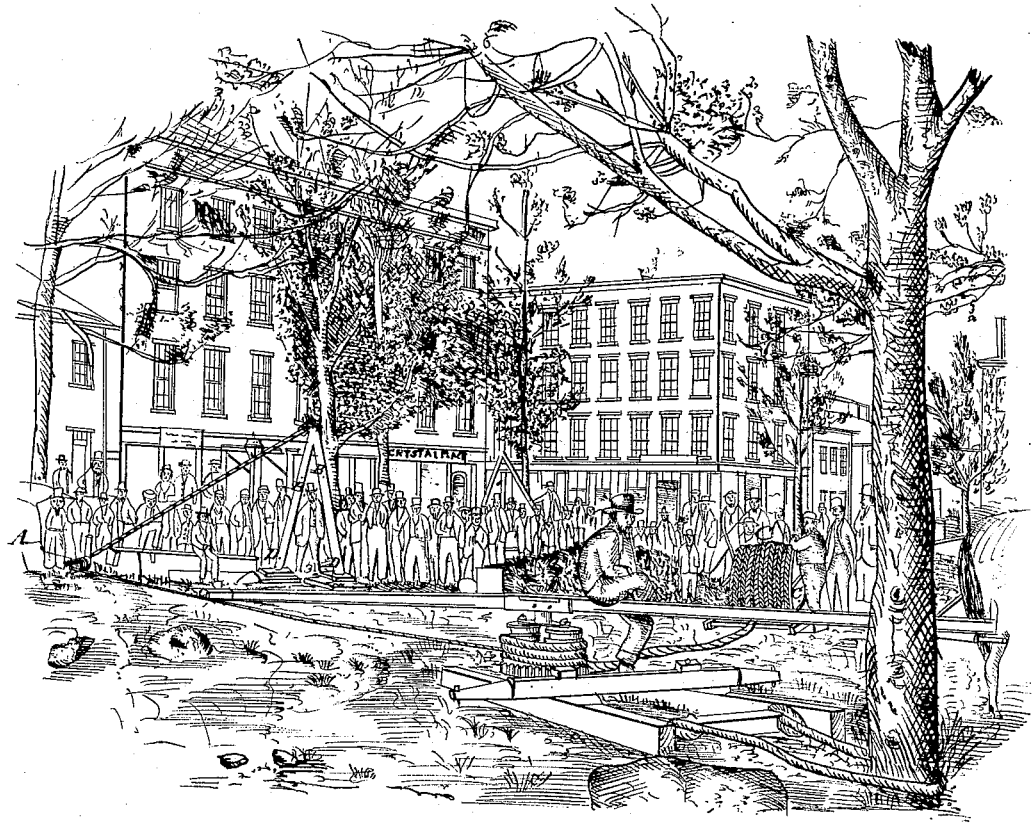
Witnesses:
Inventor:

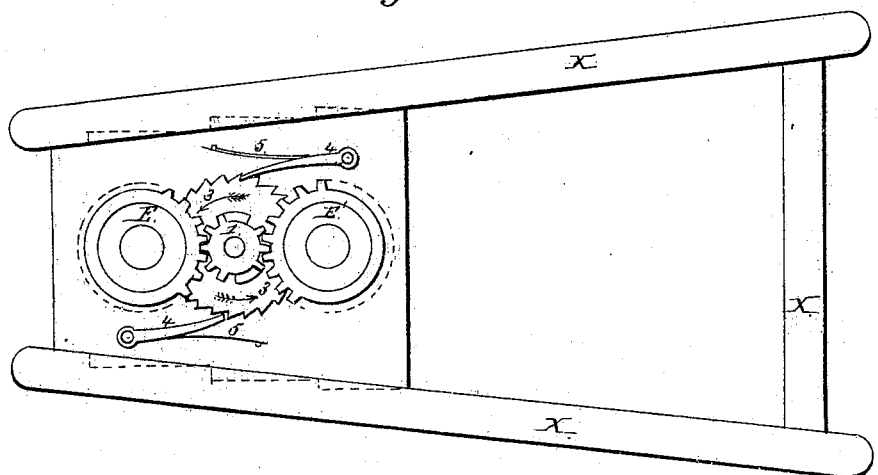
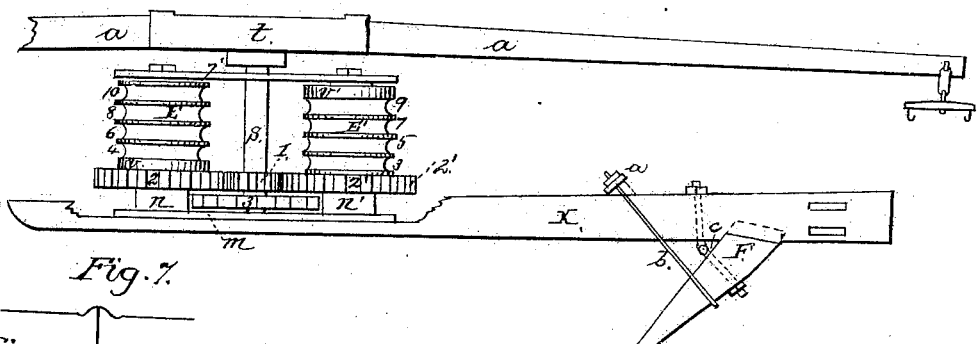

UNITED STATES PATENT OFFICE.

RICHD. P. SMITH AND JOS. R. GATES, OF LOUISVILLE, KENTUCKY.

IMPROVEMENT IN MOLE-PLOWS.

Specification forming part of Letters Patent No. 34,074, dated January 7, 1862.

*To all whom it may concern:*

Be it known that we, R. P. SMITH and J. R. GATES, of the city of Louisville, and State of Kentucky, have made new and useful Improvements and Combinations in Mole-Drain Plows, Power-Capstan, and Stump-Pullers; and we do hereby declare that the following, together with the accompanying drawings, is a full and exact description of the same, reference being had to letters and figures marked thereon.

The nature and objects of our invention are, first, a press-wheel so constructed as to completely close the crevice made by the knife (or colter) passing through the ground, and at the same time forming a ridge immediately over the drain, and a duct (or channel surface-drain) on either side of the crevice made by the knife, thus carrying the surface-water away from the crevice above named; second, obtaining a capstan of great power, cheaply constructed, very portable, easily managed, and by which the operator can use any desired length of rope without surging or chafing the rope, thus causing the rope to last a great deal longer than when used on the old single-spool capstan, and also enabling the operator to draw the plow one thousand feet without moving the capstan, the time thus saved being about fifty per cent., giving this amount of gain in the work accomplished; third, the combination of the chains, shares, snacth-block, and portable capstan, producing a very powerful and easily-managed stump-puller, that can be operated to the length of rope (one thousand feet) without moving any part of the machine except the shares and chain.

Figure 1 is a perspective view of the machine as used for pulling trees or stumps. Fig. 2 is a bird's-eye view of the frame and capstan, showing the mode of gearing, ratchet-wheel 3, and pawl 4, used after the ordinary manner to insure safety. Fig. 3 is a vertical view of frame and capstan, showing the mode of attaching the power, the position of the spools, gear-wheels, ratchet-wheel, and the flexible foot or anchor as hinged to the under side of the frame. Fig. 4 is the beam and plow as used, showing Cole and Wall's patent mole with our improved press-wheel, also the mode of securing the knife-plates to the beam by stirrup $g$. Fig. 5 is a vertical view of the cast studs or horns, which are bolted to the frame and support the spools E E'. Fig. 6 is a vertical view of the press-wheel. Fig. 7 shows the shape in which our improved press-wheel leaves the earth over the drain when complete.

The horns $n$ $n$ and plate $m$ are cast in one piece, being hollow, to obtain greater strength with a given weight. These horns or studs are bolted fast to the frame $x$. The shaft S, with pinion 1 and ratchet-wheel 3, is then set in its place.

The spools E' and spur-wheels 2' are cast hollow and in one piece, with no difference, except that the space $v$ on the front spool, E, is on its lower end, while the same space, $v'$, on E' is on its upper end, so that as the rope winds on at 3 it is always kept close to the base, and as it passes on the opposite side to groove 4 it is elevated one inch, (half width of the rope.) As it passes back to 5 it is elevated one inch more, thus clearing the rope on 3, and so on, as many times as may be found necessary to prevent slipping. By this arrangement of the grooves the rope is prevented from rubbing and wearing out, one strand against another, as passing around with a heavy draft on it. Another great advantage is gained by these grooves supporting the rope in its round form while encircling the grooves and preventing the outside fibers from breaking, (or straining,) as is the case when a rope is drawn tight around a flat or smooth spool. By means of these grooves two or three turns will prevent slipping, so that a boy can wind up the slack on the reel $c$, Fig. 1. Thus a coil of rope one thousand feet long can be used with ease and safety. The spur-wheels 2 2' are sixteen inches in diameter and about four and one-half inches face, giving sufficient strength. These spools are supported by collars H H from interfering with the ratchet-wheel 3. The top plate, 7', is then put on, supporting shaft S and bracing the top of studs $n$ $n'$. Lever-socket $t$ completes this part of the machine.

The foot F is attached, as shown in the drawings, by hinge-bolts $c$ and stirrup $b$. The great advantage gained by this device is in moving from place to place. Thus by drawing the stirrup $b$ back at $a$ the foot is folded close to the frame $x$, making it much easier moved about, and can be hauled on ordinary wheels without the feet interfering with obstacles on the ground.

The plow, as shown, is of the ordinary kind, and needs no description, except the press-wheel o. As this is a very important feature in our invention, and very imperfectly understood by those who have had no practical experience in making drain by these machines, we shall describe it more fully than simply describe the wheel.

It is a conceded fact that if the clevice made by the knife $k$ is not closed by repacking the clay into it and protecting the top from the surface-water, the water will break its way down through the crevice, and thus carry sufficient trash into the drain to fill it up and destroy it. This concave press-wheel, as shown in Fig. 6, accomplishes this object completely by pressing the ground from each side to the center, entirely closing the crevice and at the same time forming a ridge directly over the drain, (or crevice,) and two small ducts or channels on either side conveying the surface-water off from the crevice, as shown in Fig. 7.

To operate the machine as a drain-plow the capstan is anchored up the line of drain the length of rope—say one thousand feet—from the outlet or mouth of drain, where the plow is inserted, the rope is thrown around the spools, as shown in Fig. 1, levers inserted, and it is ready for operation.

As a stump-pulley the capstan is anchored at a convenient place in line with a stump or tree, to which the snatch-block A can be attached. This snatch-block has two objects—first, holds the rope in line with the capstan while the shares are operated in different directions; second, holds the rope to the ground, preventing the capstan from rising, and enables the horses to step over the rope with ease.

The shares B B, with heavy chains attached to their top and to the stump at the bottom, are used in the usual way.

By actual experiment with one horse to a fourteen-foot lever we have parted a solid iron hook three inches broad by one inch thick, and have also repeatedly parted a chain made of the best one and one-half inch Swede iron.

We claim—

The draining-plow, Fig. 4, provided with a press-wheel, o, with a concave periphery, when used in combination with the double-spool capstan, constructed as set forth, for the purpose of under draining.

RICHARD P. SMITH.
JOS. R. GATES.

Witnesses:
JOHN PENDEGRASS,
H. W. B. WILSON.